United States Patent [19]
Clark

[11] Patent Number: 5,816,766
[45] Date of Patent: Oct. 6, 1998

[54] REFUSE VEHICLE DUMPING SYSTEM

[75] Inventor: Robert M. Clark, Liberty, S.C.

[73] Assignee: Toccoa Metal Technologies, Inc., Toccoa, Ga.

[21] Appl. No.: 797,352

[22] Filed: Feb. 11, 1997

[51] Int. Cl.[6] ........................................................ B60P 1/00
[52] U.S. Cl. ........................ 414/517; 414/511; 414/525.3; 414/786; 298/23 M
[58] Field of Search ................................. 414/786, 517, 414/516, 515, 514, 513, 512, 511, 525.1, 525.2, 525.3, 525.4, 525.51, 525.52, 525.53, 525.54, 525.55; 100/60; 298/23 R, 23 MD, 23 M, 23 A, 23 S

[56] References Cited

U.S. PATENT DOCUMENTS

| | | | |
|---|---|---|---|
| 2,538,980 | 1/1951 | Payne, Jr. | 268/75 |
| 3,272,552 | 9/1966 | Park | 296/56 |
| 3,305,263 | 2/1967 | Appleman | 296/56 |
| 3,440,763 | 4/1969 | O'Brien | 49/280 |
| 3,662,910 | 5/1972 | Herpich et al. | 214/302 |
| 3,757,969 | 9/1973 | Smith | 214/83.3 |
| 3,860,288 | 1/1975 | Martin et al. | 298/23 MD |
| 3,865,260 | 2/1975 | Wieschel et al. | 414/512 |
| 3,869,168 | 3/1975 | Matheson | 296/56 |
| 3,888,366 | 6/1975 | Prahst | 214/83.22 |
| 3,899,091 | 8/1975 | Smith | 414/525.4 |
| 4,051,746 | 10/1977 | Liljeros | 74/520 |
| 4,091,944 | 5/1978 | Gollnick | 214/302 |
| 4,109,963 | 8/1978 | Sieving et al. | 298/23 M |
| 4,116,121 | 9/1978 | Liberman et al. | 100/39 |
| 4,307,541 | 12/1981 | Farmer et al. | 49/280 |
| 4,396,342 | 8/1983 | Henderson | 414/511 |
| 4,427,231 | 1/1984 | Smith | 298/23 R |
| 4,468,065 | 8/1984 | Taniguchi | 298/23 R |
| 4,522,551 | 6/1985 | Henneberry | 414/525.52 |
| 4,538,951 | 9/1985 | Yeazel et al. | 414/407 |
| 4,627,783 | 12/1986 | DeFilippi | 298/23 M |
| 4,647,267 | 3/1987 | Hund, Jr. | 414/408 |
| 4,866,641 | 9/1989 | Nielson et al. | 364/559 |
| 4,877,366 | 10/1989 | DeFilippi | 298/23 M |
| 5,004,392 | 4/1991 | Naab | 414/21 |
| 5,006,030 | 4/1991 | Smith et al. | 414/406 |
| 5,015,142 | 5/1991 | Carson | 414/408 |
| 5,015,144 | 5/1991 | Smith et al. | 414/525.2 |
| 5,035,564 | 7/1991 | Matsumoto | 414/409 |

(List continued on next page.)

FOREIGN PATENT DOCUMENTS

| | | | |
|---|---|---|---|
| 1051389 | 3/1979 | Canada | 214/83 |
| 557701 | 8/1932 | Germany . | |
| 23 45 597 | 3/1975 | Germany . | |
| 35 37 546 | 4/1987 | Germany . | |
| 876349 | 8/1961 | United Kingdom . | |

OTHER PUBLICATIONS

Dempster RFL Brochure
Dempster Recycle One Brochure

*Primary Examiner*—Karen M. Young
*Assistant Examiner*—Douglas Hess
*Attorney, Agent, or Firm*—Kennedy,Davis & Kennedy, P.C.

[57] ABSTRACT

A front loading refuse collection vehicle 10 is provided having a body 12 which includes a hopper 16, a storage container 17, and a tailgate 20. A pair of hydraulic cylinders 23 are mounted to the tailgate for pivotal movement thereof. A compaction blade 24 is mounted within storage container 17 for movement by a hydraulic cylinder 25. The vehicle also has a dumping system 45 for automated actuation of the compaction blade hydraulic cylinder 25 and the tailgate hydraulic cylinders 23. The dumping system includes a central multi-processor 46 coupled to receive electronic signals from an auto-eject actuation button 47, a tailgate enable switch 48, a latch sensor 50, a tailgate open sensor 51 and a compaction blade sensor 52. The central multiprocessor is coupled to output electronic signals to a hydraulic control valve 57 for the tailgate hydraulic cylinders and a hydraulic control valve 58 for the compaction blade hydraulic cylinder. The dumping system coordinates the movement of the tailgate hydraulic cylinder and compaction blade cylinders in response to the tailgate open sensor and compaction blade sensor.

14 Claims, 4 Drawing Sheets

U.S. PATENT DOCUMENTS

| | | | |
|---|---|---|---|
| 5,062,759 | 11/1991 | Pieperhoff | 414/408 |
| 5,064,333 | 11/1991 | Wurtz | 414/408 |
| 5,143,496 | 9/1992 | Smith et al. | 410/68 |
| 5,158,340 | 10/1992 | Boda | 298/23 M |
| 5,197,782 | 3/1993 | May et al. | 298/23 M |
| 5,203,669 | 4/1993 | Klossek et al. | 414/525.2 |
| 5,288,137 | 2/1994 | Henry | 298/23 DF |
| 5,288,196 | 2/1994 | Horning et al. | 414/407 |
| 5,316,430 | 5/1994 | Horning et al. | 414/407 |
| 5,322,407 | 6/1994 | Reck et al. | 414/406 |
| 5,431,523 | 7/1995 | Ferguson | 414/525.9 |
| 5,458,452 | 10/1995 | Pellegrini | 414/406 |
| 5,478,188 | 12/1995 | Rea et al. | 414/525.54 |
| 5,484,246 | 1/1996 | Horning et al. | 414/409 |
| 5,503,450 | 4/1996 | Miller | 296/100 |
| 5,513,942 | 5/1996 | Pickrell | 414/525.2 |
| 5,520,443 | 5/1996 | Zanzig | 298/23 M |
| 5,527,098 | 6/1996 | McKinney et al. | 298/23 MD |
| 5,584,642 | 12/1996 | Huntoon | 414/525.2 |

REFUSE VEHICLE DUMPING SYSTEM

TECHNICAL FIELD

This invention relates to refuse vehicles, and specifically to systems for the dumping of refuse from the vehicle.

BACKGROUND OF THE INVENTION

Refuse vehicles has existed for many years. These vehicles typically have a cab, lifting fork, a hopper and a container in which the refuse is stored during transportation. The container has a rear tailgate covering a rear opening, hydraulic cylinders which raise the tailgate and a compaction blade which compacts the refuse within the container and forces the refuse from the container through the rear opening when dumping. The tailgate is secured in its closed position by a manual latch. In addition, or as an alternative to the compaction blade, the vehicle may also include hydraulic cylinders which tilt the container to aid the expulsion of the refuse from the container.

In use, an operator drives the vehicle to a dump site for unloading the refuse. The operator then exits the cab and moves to the rear of the vehicle to manually disengage the tailgate latches. The operator must return to the cab to actuate the hydraulic cylinder controls to raise the tailgate to an open position. Once the tailgate is fully raised, the operator actuates the movement of the compaction blade hydraulic cylinder control. Upon a complete cycling of the compaction blade, the tailgate is returned to its closed position. The operator must then leave the cab and return to the rear of the vehicle to manually engage the latches in order to secure the tailgate. The operator then returns to the cab to drive the vehicle from the dump site.

The constant movement of the operator from the cab to the latches, from the latches back to the cab, from the cab back to the latches, and then back to the cab is tiresome and inconvenient. In foul weather this becomes a greater problem. However, more importantly, this movement also exposes the operator to many dangers. Firstly, there is the potential that the operator may fall upon exiting or re-entering the elevated cab to operate the hydraulics or manually engage/disengage the latches. Secondly, should the refuse within the container be pressed against the tailgate, the release of the latches may cause the tailgate to open quickly upon release, thereby hitting the operator. If this occurs, the refuse therein may also fall upon the operator as the tailgate opens. Thirdly, as many government entities require an operator to be present within the cab at all times, there must be two operators present to manually release the latches while simultaneously having someone within the cab during the release of the latches.

Accordingly, it is seen that a need remains for a refuse vehicle that can dump refuse from within the container in a safe and efficient manner. It is to the provision of such therefore that the present invention is primarily directed.

SUMMARY OF THE INVENTION

In a preferred form of the invention a refuse vehicle of the type having a container body with a rear tailgate, lifting means for moving the tailgate between a closed position and an open position, a reciprocating compaction blade mounted within the container body, and a latch for latching and unlatching the tailgate is provided with an automated dump system. The system includes means for moving the latch from a latched position to an unlatched position releasing the tailgate, first sensing means for sensing a selected open position of the tailgate, means for actuating the compaction blade, and control means for controlling the moving means and the actuating means in response to a signal from the first sensing means indicating the sensing of the selected open position of the tailgate.

DETAILED DESCRIPTION

Figure 1:
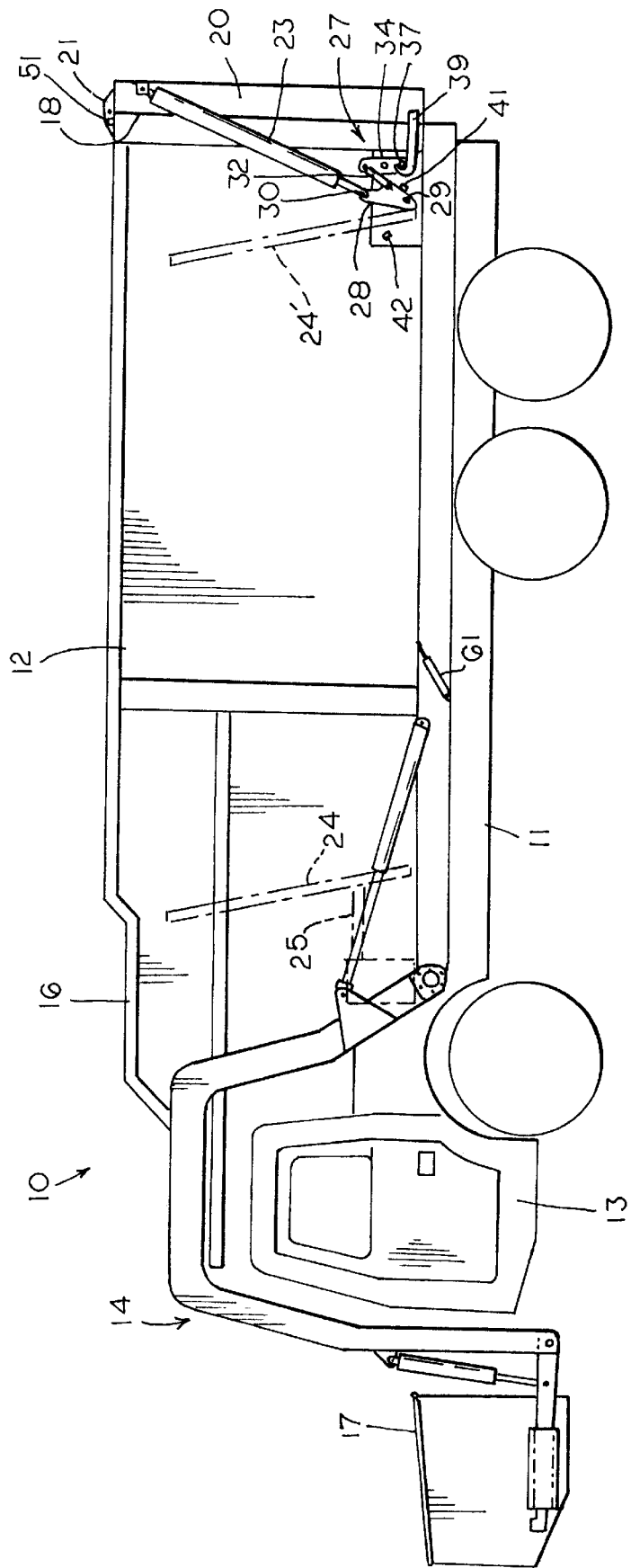
FIG. 1 is a side view of a refuse vehicle embodying principles of the invention in a preferred form.

With reference next to the drawings, there is shown a front loading refuse collection vehicle 10 having a chassis 11 on which is mounted a body 12, a cab 13 and a loader device 14. The body 12 includes a hopper 16 the body having an open end 18, and a tailgate 20 pivotally mounted to the top of the body by a hinge 21 for movement between an open position and a closed position covering the open end 18. A pair of hydraulic cylinders 23 are mounted to the tailgate 20 for pivotal movement thereof about hinge 21. A compaction blade 24, shown in phantom lines, is mounted within body 12 for movement by a hydraulic cylinder 25, shown in phantom lines between a retracted position and an extended, compaction position 24'. The previously described components are all conventional.

The bottom end of each tailgate hydraulic cylinder 23 is coupled to a latching assembly 27. Latching assembly 27 has a first link 28 having one end mounted to the body 12 for pivotal movement about a pivot 29 and an opposite end coupled to the bottom end of cylinder 23 for pivotal movement about a pivot 30. A second link 32 is coupled at one end to first link 28 for pivotal movement about a pivot 33 and coupled at its opposite end to a third link 34 for pivotal movement about a pivot 35. The third link 34 is mounted to the body 12 for pivotal movement about a pivot 36. Third link 34 has a post 37 adapted to be received by a hook 39 extending from the bottom of the tailgate 20. The second link 32 is preferably a clevis type assembly having a threaded middle portion 40 so as to make the link adjustable in length. A rear stop 41 is mounted to the body to limit rearward movement of first link 28. Likewise, a forward stop 42 is mounted to the body to limit forward movement of first link 28.

Figure 3:
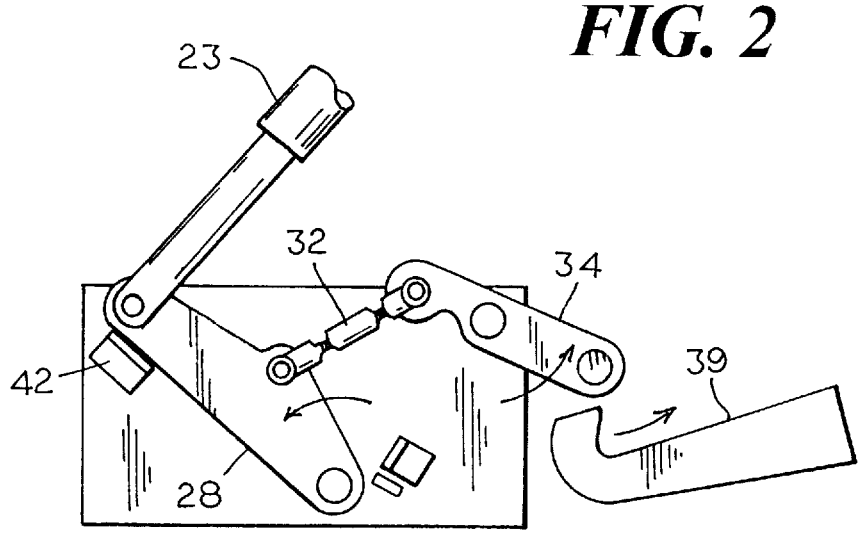
FIG. 3 is a side view of the latching assembly of the refuse vehicle of FIG. 1, shown with the latch in an open configuration.
Figure 4:
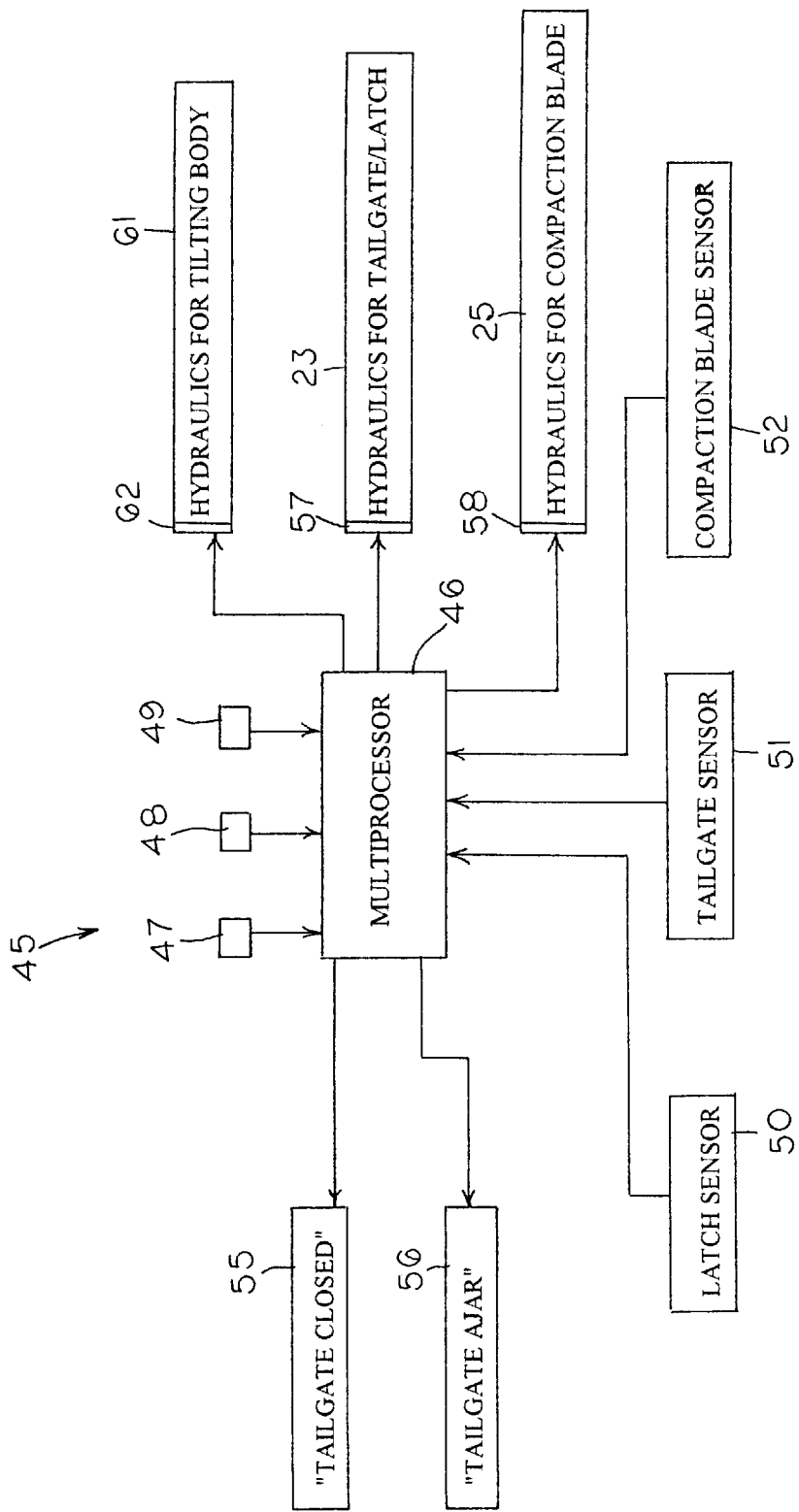
FIG. 4 is a schematic diagram of the refuse vehicle dumping system of the refuse vehicle of FIG. 1.

In a latched closed configuration, pivot 33 is positioned past a centerline CL extending between pivot 29 and pivot 35. This over-center positioning of pivot 33 maintains the latch assembly 27 in a closed configuration even with outward or rearward pressure exerted upon the tailgate 20. Such outward pressure will force pivot 33 in a rearward direction rather than to a forward, unlatch direction to an unlatched position shown in FIG. 3.

The vehicle also has a dumping system 45 for controlled actuation of the compaction blade hydraulic cylinder 25 and the tailgate hydraulic cylinders 23. The dumping system 45 includes a central multiprocessor 46, such as those made by ORVITEK, INC. of Markham, Ontario, Canada. The multiprocessor 46 is coupled to receive electronic signals from an auto-eject actuation button 47, a tailgate enable switch 48, an emergency stop button 49, a latch sensor 49, a tailgate open sensor 50 and a compaction blade sensor 51. The latch sensor 50 and the tailgate open sensor 51 are preferably proximity-type sensors such as that made by TURCK, INC. of Minneapolis, Minn. as model number BI15-CKYO-AP6X2-H1141. The compaction blade sensor 52 is preferably a hydraulic pressure type sensor in fluid communication with hydraulic cylinder 25, such as that made by DATA INSTRUMENTS, INC. of Acton, Mass. under model number Eclipse 5000psi. The tailgate enable switch 48 has a tailgate open position, a tailgate close position and a neutral position therebetween. The central multiprocessor 46 outputs electronic signals to a tailgate closed indicator 55, a tailgate ajar indicator 56, a hydraulic control valve 57 for the actuation of the tailgate hydraulic cylinders 23 and a hydraulic control valve 58 for the actuation of the compaction blade hydraulic cylinder 25. The auto-eject button 47, tailgate enable switch 48 and emergency stop button 49 are mounted within the cab 13 of the vehicle so as to be accessible to the driver. The hydraulic control valves 57 and 58 are conventional and oriented as a bank of valves in fluid communication with a central hydraulic oil supply.

In use, the driver positions the vehicle for release of the refuse. The driver then simultaneously actuates the auto-eject button 47 and the tailgate enable switch 48 to its tailgate open position to signal the multiprocessor 46 to initiate the dumping process. The multiprocessor 46 signals the tailgate hydraulic control valve 57 to cause the extension of the hydraulic cylinders 23 so as to lift the tailgate 20 to its open position. The extension of the tailgate hydraulic cylinders 23 causes the first link 28 to rotate counterclockwise about pivot 29, thereby causing the second link 32 to rotate the third link 34 about pivot 36. The counterclockwise rotation of third link 34 moves post 37 rearward, thereby releasing tailgate hook 39. The movement of the first link 28 from its initial position triggers the latch sensor 50 to signal this condition to the multiprocessor 46, which in turn de-energizes the tailgate closed indicator 55 and energizes the tailgate ajar indicator 56.

The movement of the tailgate 20 to its fully open position triggers the tailgate open sensor 51 to signal the open condition of the multiprocessor 46. The multiprocessor then actuates the compaction blade hydraulic control valve 58 to cause the extension of the compaction blade hydraulic cylinder 25. The movement of the compaction blade 24 to its fully extended position 24' triggers the compaction blade sensor 52 to signal a high pressure condition to the multiprocessor. The multiprocessor then actuates the compaction blade hydraulic control valve 58 to reverse the movement of the compaction blade 24 back to its initial, retracted position. Once the multiprocessor senses that the compaction blade 24 has returned to its initial position, through a low pressure condition signal from compaction blade sensor 52, the system multiprocessor idles the actuation of the system hydraulics while awaiting the next command. The operator may then either cycle the compaction blade again or move the tailgate enable switch 48 to its close position to cause the tailgate to close.

Figure 2:
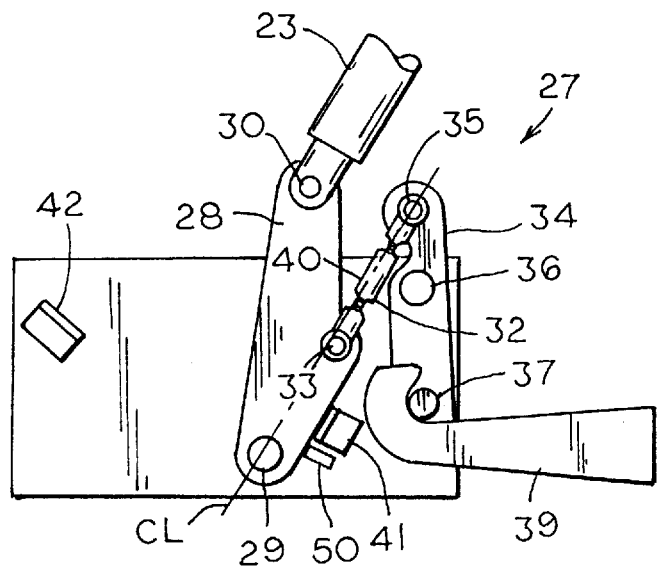
FIG. 2 is a side view of the latching assembly of the refuse vehicle of FIG. 1, shown with the latch in a closed configuration.
Figure 5:
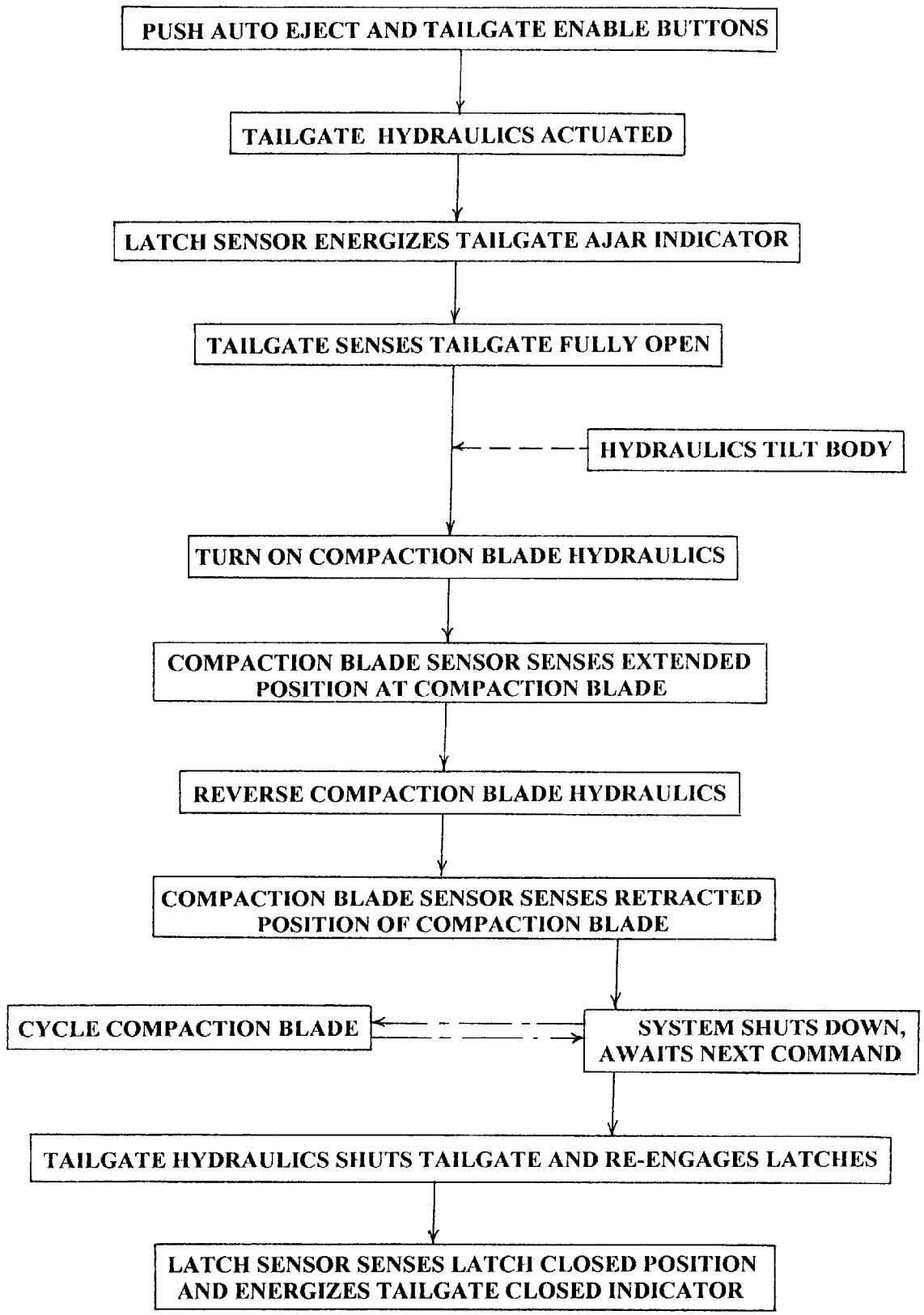
FIG. 5 is a flow chart of the operation of the dumping system of FIG. 4.

With actuation of the enable switch 48 to its close position the multiprocessor 46 actuates the tailgate hydraulic control valve 57 to retract the tailgate hydraulic cylinders 23 so as to return the tailgate 20 to its closed position. The complete retraction of hydraulic cylinders 23 causes the opposite rotation of the latching assembly links 28, 32 and 34 to once again latch the tailgate closed, as shown in FIG. 2. The movement of the first link 28 back to its initial position causes the latch sensor 50 to signal this condition to the multiprocessor, which then de-energizes the tailgate ajar indicator 56 and re-energizes the tailgate closed indicator 55. As a safety precaution, the emergency stop button 49 may be depressed at any time to halt the operation of the dumping system 45. Once the tailgate 20 is fully closed and latched the operator releases the tailgate enable switch 48 to return the switch to its neutral position. The operation of the dumping system, as just described, is illustrated in the flow chart shown in FIG. 5.

It has now been demonstrated that the dumping system 45 automatically coordinates the release of the latching assembly 27, the lifting of the tailgate 20, the actuation of the compaction blade 24, the lowering of the tailgate, and the re-engaging of the latching assembly without the operator having to leave the vehicle cab. As such, this system eliminates the hazards associated with an operator having to move about the vehicle in order to accomplish each of these tasks. Additionally, the vehicle may be operated and the contents dumped by a single operator.

It should be understood that the just described system may also be used in conjunction with refuse vehicles which use conventional hydraulic cylinders 61 to tilt a storage container 17 when dumping the refuse therein. Here, the multiprocessor 46 is coupled to a storage container tilting hydraulic control valve 62. In use, the multiprocessor causes the storage container 17 to tilt through signaling the hydraulic control valve 62 to extend the hydraulic cylinders 61 prior to actuation of the compaction blade 24.

It should also be understood that the coordinated movement of raising the tailgate and the operation of the compaction blade may be accomplished through operation of a time sequence. Hence, the sensing of the tailgate position and the compaction blade position may be measured by the passage of time rather than physical positioning. Thus, the timing sequence is the sensing means by which the system operates. However, it should be understood that the sensing of the physical positions is preferred for accuracy purposes.

It thus is seen that a refuse vehicle is now provided which may unload its contents in a safe and efficient manner. While this invention has been described in detail with particular references to the preferred embodiments thereof, it should be understood that many modifications, additions and deletions, in addition to those expressly recited, may be made thereto without departure from the spirit and scope of the invention as set forth in the following claims.

I claim:

1. In a refuse vehicle of the type having a container body with a rear tailgate, lifting means for moving the tailgate between a closed position and an open position, a reciprocating compaction blade mounted within the container body, and a latch for latching and unlatching the tailgate, the improvement comprising an automated dump system including,
    (a) means for moving said latch from a latched position to an unlatched position releasing said tailgate;
    (b) first sensing means for sensing a selected open position of said tailgate;
    (c) means for actuating said compaction blade; and
    (d) control means for controlling said moving means and said actuating means in response to a signal from said first sensing means indicating the sensing of the selected open position of said tailgate.

2. The refuse vehicle of claim 1 further comprising second sensing means coupled to said control means for sensing a selected cycling position of said compaction blade.

3. The refuse vehicle of claim 2 further comprising latch sensing means coupled to said control means for sensing the unlatched position of said latch, and indicator means coupled to said control means for indicating the sensed unlatched position of the latch from said latch sensing means.

4. The refuse vehicle of claim 1 further comprising means for tilting said container body.

5. A method of dumping refuse from a vehicle of the type having a container body with a rear tailgate, lifting means for moving the tailgate between a closed position and an open position, a reciprocating compaction blade mounted within the container body, and a latch for latching and unlatching the tailgate, the method comprising the steps of:

(a) manually triggering control means to generate a commencement signal;

(b) relaying the commencement signal from the control means to latch actuation means for actuating the latch from a latched position to an unlatched position;

(c) relaying a lifting signal from the control means to the lifting means to actuate the lifting of the tailgate;

(d) generating a tailgate open signal from a tailgate position sensor indicating a selected position of the tailgate, and relaying the tailgate open signal to the control means; and (e) actuating the compaction blade in response to the control means receiving the tailgate open signal.

6. The method of claim 5 further comprising the step of (f) sensing a selected cycling position of the compaction blade and generating and relaying an electronic compaction blade position signal to the control means.

7. The method of claim 5 further comprising the step of (f) sensing a selected position of the latch and generating and relaying an electronic latch position signal indicating the unlatched position of the latch to the control means.

8. The method of claim 5 further comprising the step of (f) tilting the container body prior to actuation of the compaction blade.

9. A refuse vehicle comprising:

a container body;

a rear tailgate pivotally mounted to said body;

a latch configured to releasably hold said tailgate against said body;

tailgate actuation means for movement of said tailgate between a closed position and an open position;

a compaction blade mounted within the container body;

compaction blade actuation means for reciprocal movement of said compaction blade between a retracted position and an extended position;

tailgate control means for controlling the actuation of said tailgate actuation means;

a tailgate position sensor for sensing a selected position of said tailgate and generating a tailgate position signal; and central control means for controlling the actuation of said compaction blade actuation means in response to receiving a tailgate position signal from said tailgate position sensor.

10. The refuse vehicle of claim 9 wherein said central control means also controls the actuation of said tailgate control means.

11. The refuse vehicle of claim 9 further comprising a compaction blade sensing means for sensing a selected position of said compaction blade and generating a compaction blade position signal to said central control means.

12. The refuse vehicle of claim 9 further comprising latch control means for controlling the latching actuation of said latch, said latch control means being coupled to said central control means for coordinated movement thereof.

13. The refuse vehicle of claim 12 further comprising latch sensing means coupled to said central control means for sensing the unlatched position of said latch, and indicator means coupled to said central control means for indicating the sensed unlatched position of the latch.

14. The refuse vehicle of claim 9 further comprising means for tilting said container body.

* * * * *